US012374835B2

(12) United States Patent
He et al.

(10) Patent No.: US 12,374,835 B2
(45) Date of Patent: Jul. 29, 2025

(54) CONNECTORS AND CONNECTOR ASSEMBLY

(71) Applicant: Tyco Electronics (Shanghai) Co. Ltd., Shanghai (CN)

(72) Inventors: Hua He, Shanghai (CN); Yong (Chris) Wang, Shanghai (CN); Yingchun (David) Wang, Shanghai (CN); Yong Yang, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 340 days.

(21) Appl. No.: 17/896,296

(22) Filed: Aug. 26, 2022

(65) Prior Publication Data

US 2023/0062211 A1 Mar. 2, 2023

(30) Foreign Application Priority Data

Aug. 27, 2021 (CN) ........................ 202122036084.2

(51) Int. Cl.
*H01R 13/6584* (2011.01)
*H01R 13/6591* (2011.01)

(52) U.S. Cl.
CPC ... *H01R 13/6584* (2013.01); *H01R 13/65912* (2020.08)

(58) Field of Classification Search
CPC ............... H01R 13/6586; H01R 27/02; H01R 13/6584; H01R 13/65912
See application file for complete search history.

(56) References Cited

FOREIGN PATENT DOCUMENTS

| | | | | |
|---|---|---|---|---|
| CN | 201032662 Y | * 3/2008 | | |
| CN | 211829413 U | * 10/2020 | ............ | H01R 13/40 |
| CN | 212751309 U | * 3/2021 | | |

* cited by examiner

*Primary Examiner* — Jean F Duverne
(74) *Attorney, Agent, or Firm* — Barley Snyder

(57) ABSTRACT

A connector includes a shielding member having a shield shell and a shield sheet disposed in the shield shell, an insulator having an end inserted into the shield shell, and a plurality of terminals arranged in the insulator. The shield sheet and the shield shell are formed into an integral piece. The insulator has a slot in which the shield sheet is inserted. The plurality of terminals include a power terminal and a signal terminal. The power terminal and the signal terminal are separated by the shield sheet to prevent electromagnetic interference between the signal terminal and the power terminal.

22 Claims, 4 Drawing Sheets

CONNECTORS AND CONNECTOR ASSEMBLY

CROSS-REFERENCE TO RELATED APPLICATION

This application claims the benefit of the filing date under 35 U.S.C. § 119(a)-(d) of Chinese Patent Application No. 202122036084.2, filed on Aug. 27, 2021.

FIELD OF THE INVENTION

The present invention relates to a connector and a connector assembly comprising the connector.

BACKGROUND

In the prior art, for a hybrid connector comprising a power terminal and a signal terminal, the power terminal is sometimes required to transmit up to 8 amps of current, which will cause serious electromagnetic interference to the signal transmission of the signal terminal and reduce the signal transmission quality of the signal terminal.

SUMMARY

A connector includes a shielding member having a shield shell and a shield sheet disposed in the shield shell, an insulator having an end inserted into the shield shell, and a plurality of terminals arranged in the insulator. The shield sheet and the shield shell are formed into an integral piece. The insulator has a slot in which the shield sheet is inserted. The plurality of terminals include a power terminal and a signal terminal. The power terminal and the signal terminal are separated by the shield sheet to prevent electromagnetic interference between the signal terminal and the power terminal.

BRIEF DESCRIPTION OF THE DRAWINGS

The present invention will become more apparent by describing in detail exemplary embodiments thereof with reference to the accompanying drawings, in which.

DETAILED DESCRIPTION OF THE EMBODIMENTS

Figure 1:
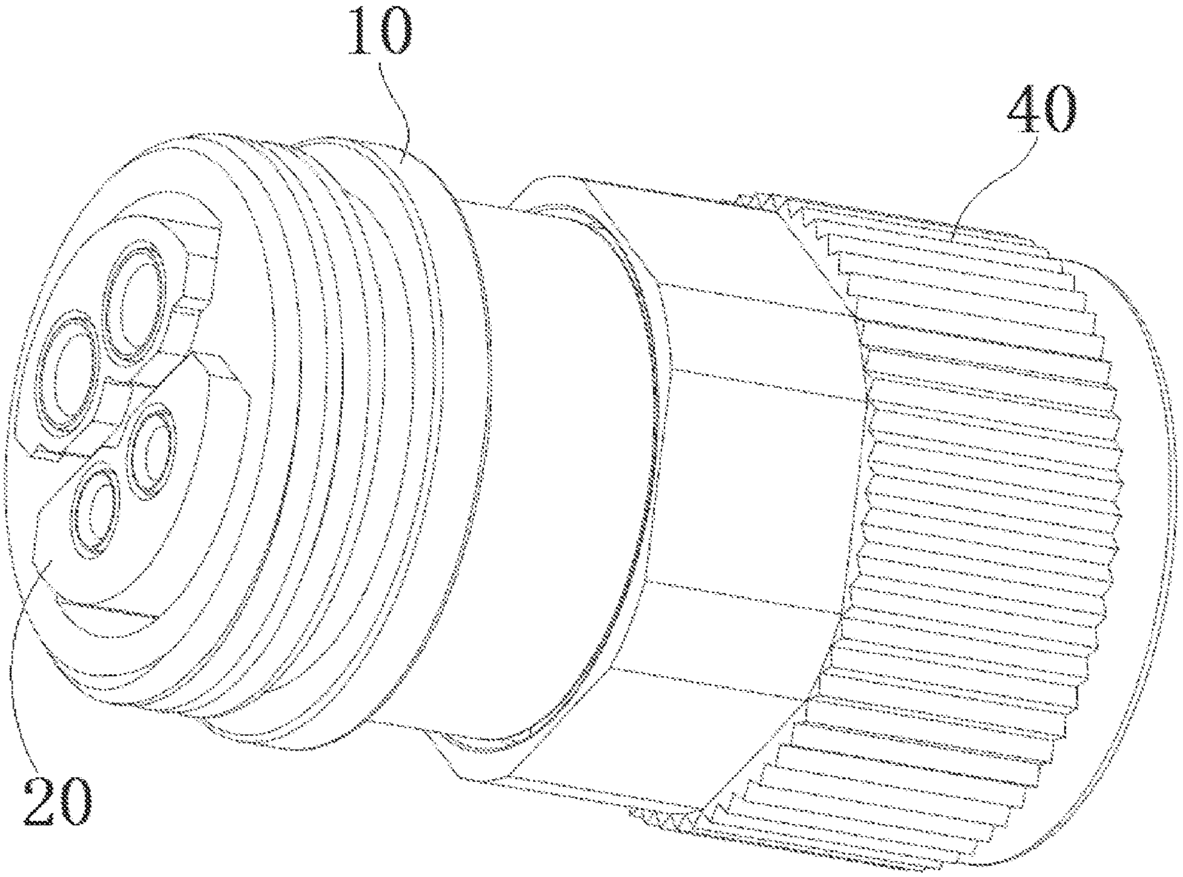
FIG. 1 is a perspective view of a connector according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general technical concept of the present invention, there is provided a connector comprising: a shielding member 10 comprising a shield shell 11; an insulator 20, one end of which is inserted into the shield shell 11; a plurality of terminals 31, 32 arranged in the insulator 20 and comprising a power terminal 31 and a signal terminal 32. The shielding member 10 also comprises a shield sheet 12 located in the shield shell 11, and the shield sheet 12 and the shield shell 11 are formed into an integral piece. A slot 22 is formed in the insulator 20, the shield sheet 12 is inserted into the slot 22, and the power terminal 31 and the signal terminal 32 are separated by the shield sheet 12 to prevent electromagnetic interference between the signal terminal 32 and the power terminal 31.

Figure 2:
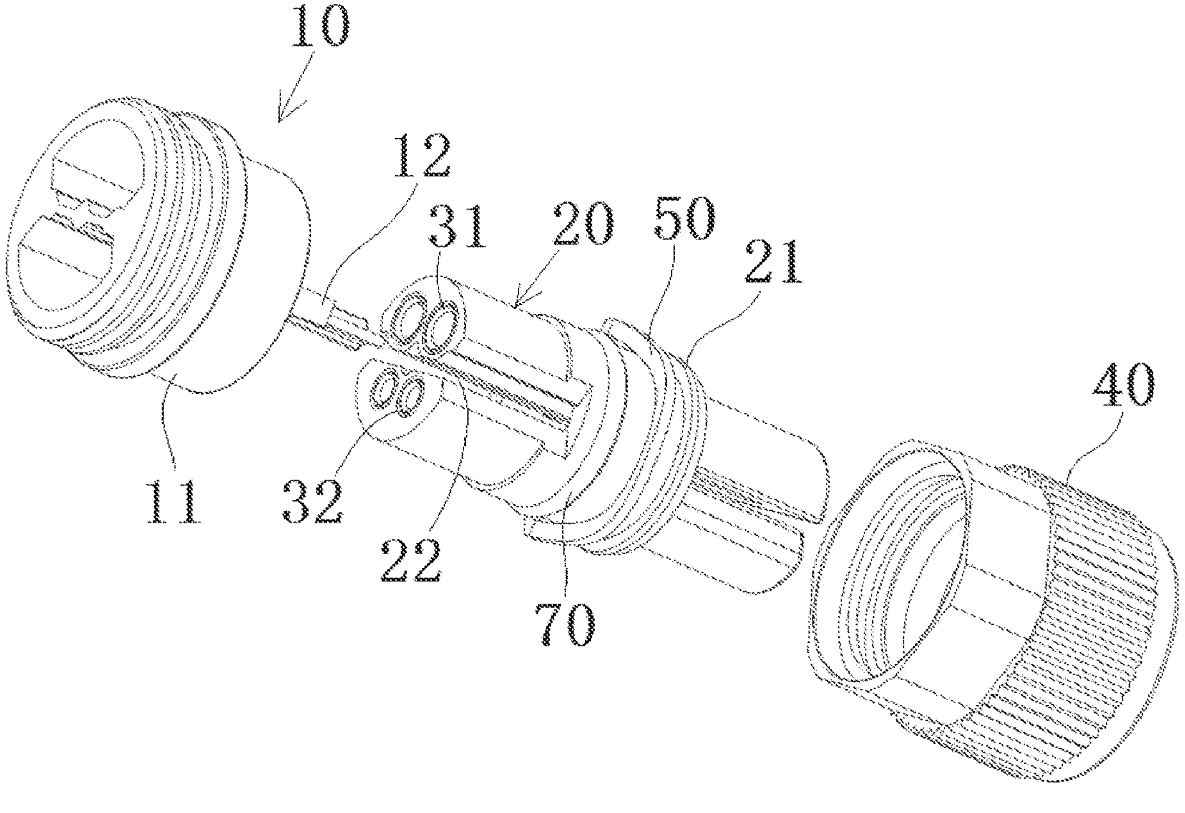
FIG. 2 is an exploded perspective view of the connector.
Figure 3:
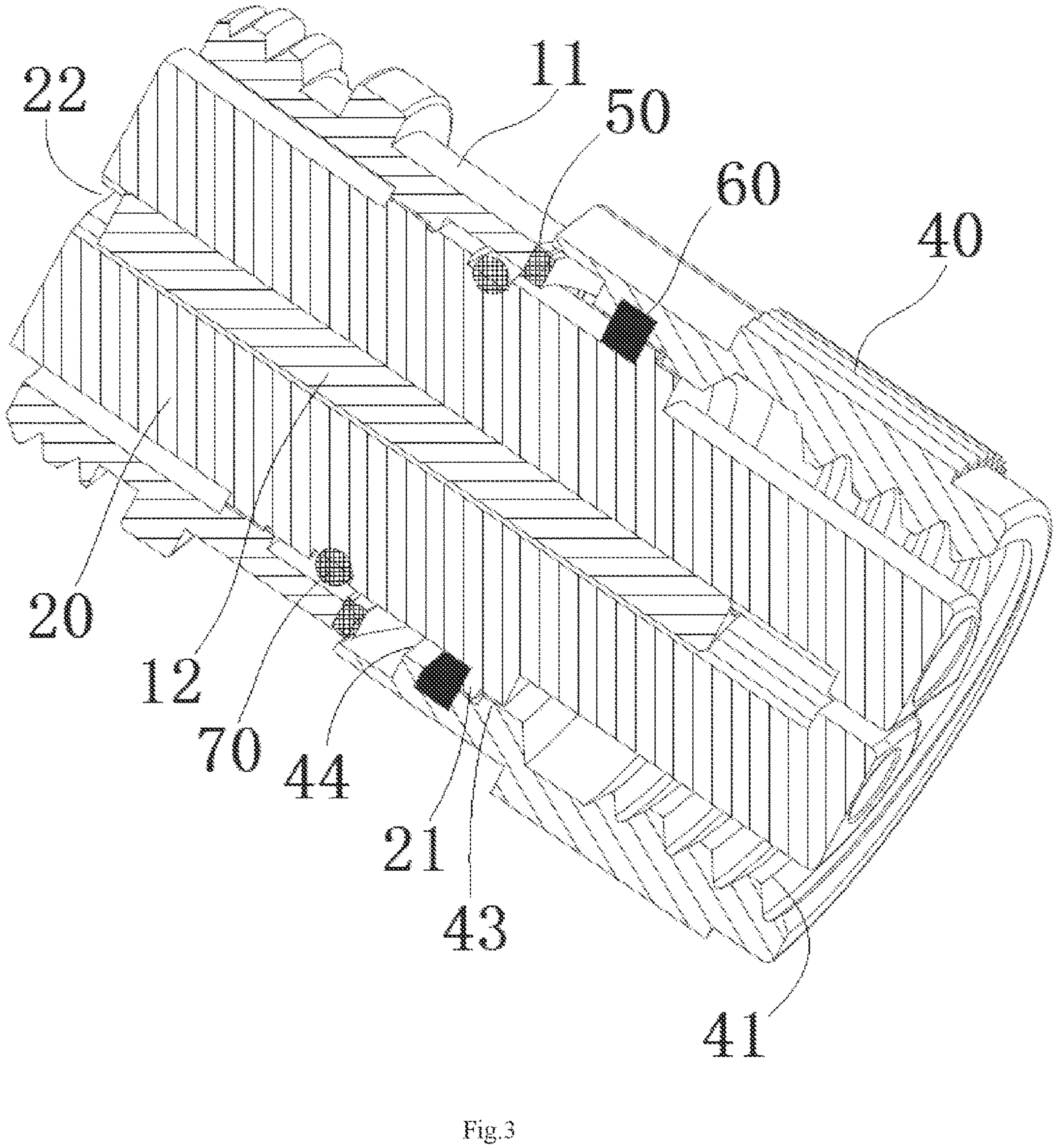
FIG. 3 is a sectional perspective view of the connector.

FIG. 1 shows an assembly diagram of a connector according to an exemplary embodiment of the present invention. FIG. 2 shows an exploded schematic diagram of a connector according to an exemplary embodiment of the present invention. FIG. 3 shows an axial sectional view of a connector according to an exemplary embodiment of the present invention.

As shown in FIGS. 1 to 3, in the illustrated embodiment, the connector mainly comprises a shielding member 10, an insulator 20, and a plurality of terminals 31 and 32. The shielding member 10 comprises a shield shell 11. One end of the insulator 20 is inserted into the shield shell 11. A plurality of terminals 31 and 32 are provided in the insulator 20, and the plurality of terminals 31 and 32 comprise a power terminal 31 and a signal terminal 32.

As shown in FIGS. 1 to 3, in the illustrated embodiment, the shielding member 10 also comprises a shield sheet 12 located in the shield shell 11. The shield shell 11 and the shield sheet 12 are formed into an integral piece.

As shown in FIGS. 1 to 3, in the illustrated embodiment, a slot 22 is formed in the insulator 20, the shield sheet 12 is inserted into the slot 22, and the power terminal 31 and the signal terminal 32 are separated by the shield sheet 12 to prevent electromagnetic interference between the signal terminal 32 and the power terminal 31.

As shown in FIG. 1 to FIG. 3, in the illustrated embodiment, the shield sheet 12 separates the internal space of the shield shell 11 into two electromagnetic shielding spaces respectively closed in the circumferential direction. The power terminal 31 is located in one of the two electromagnetic shielding spaces, and the signal terminal 32 is located in the other of the two electromagnetic shielding spaces.

As shown in FIGS. 1 to 3, in the illustrated embodiment, when the shield sheet 12 is inserted into the slot 22, the slot 22 is sealed by the shield sheet 12 to prevent the sealant from flowing through the slot 22 to the contact ends of the terminals 31 and 32 that are in electrical contact with the mating terminals of the mating connector. The shield sheet 12 is shaped to match the slot 22 of the insulator 20 to be able to seal the slot 22.

As shown in FIGS. 1 to 3, in the illustrated embodiment, the cross section of the shield sheet 12 is irregular. However, the present invention is not limited to this, and the cross section of the shield sheet 12 may also be in a regular shape, for example, a rectangular shape.

As shown in FIGS. 1 to 3, in the illustrated embodiment, the connector also comprises a conductive nut 40, which is sleeved and fixed on the other end of the insulator 20 for threaded connection with the mating connector.

As shown in FIGS. 1 to 3, in the illustrated embodiment, the connector also comprises a conductive spring 50, which is axially compressed between the conductive nut 40 and the shield shell 11 to electrically connect the shield shell 11 and the conductive nut 40.

As shown in FIGS. 1 to 3, in the illustrated embodiment, a positioning step 44 is formed on the inner wall of the conductive nut 40, and the conductive spring 50 is axially compressed between the end face of the shield shell 11 and the positioning step 44 of the conductive nut 40.

As shown in FIGS. 1 to 3, in the illustrated embodiment, a snapping groove is formed on the inner wall of the conductive nut 40, and the connector also comprises a C-type ring 60, which is snapped into the snapping groove for fixing the conductive nut 40 to the insulator 20.

As shown in FIGS. 2 and 3, in the illustrated embodiment, an annular first positioning protrusion 21 is formed on the insulator 20, and an annular second positioning protrusion 43 is formed on the inner wall of the conductive nut 40. The C-type ring 60 and the second positioning protrusion 43 are respectively against both sides of the first positioning protrusion 21, so as to fix the conductive nut 40 to the insulator 20.

As shown in FIG. 3, an internal thread 41 suitable for connection with the mating connector is formed on the inner wall of the conductive nut 40. However, the present invention is not limited to this; for example, an external thread suitable for connection with the mating connector may be formed on the outer wall of the conductive nut 40.

As shown in FIGS. 2 and 3, the connector also comprises an elastic sealing ring 70, which is sleeved on the insulator 20 and radially compressed between the shield shell 11 and the insulator 20 to seal a gap between the shield shell 11 and the insulator 20.

Figure 4:
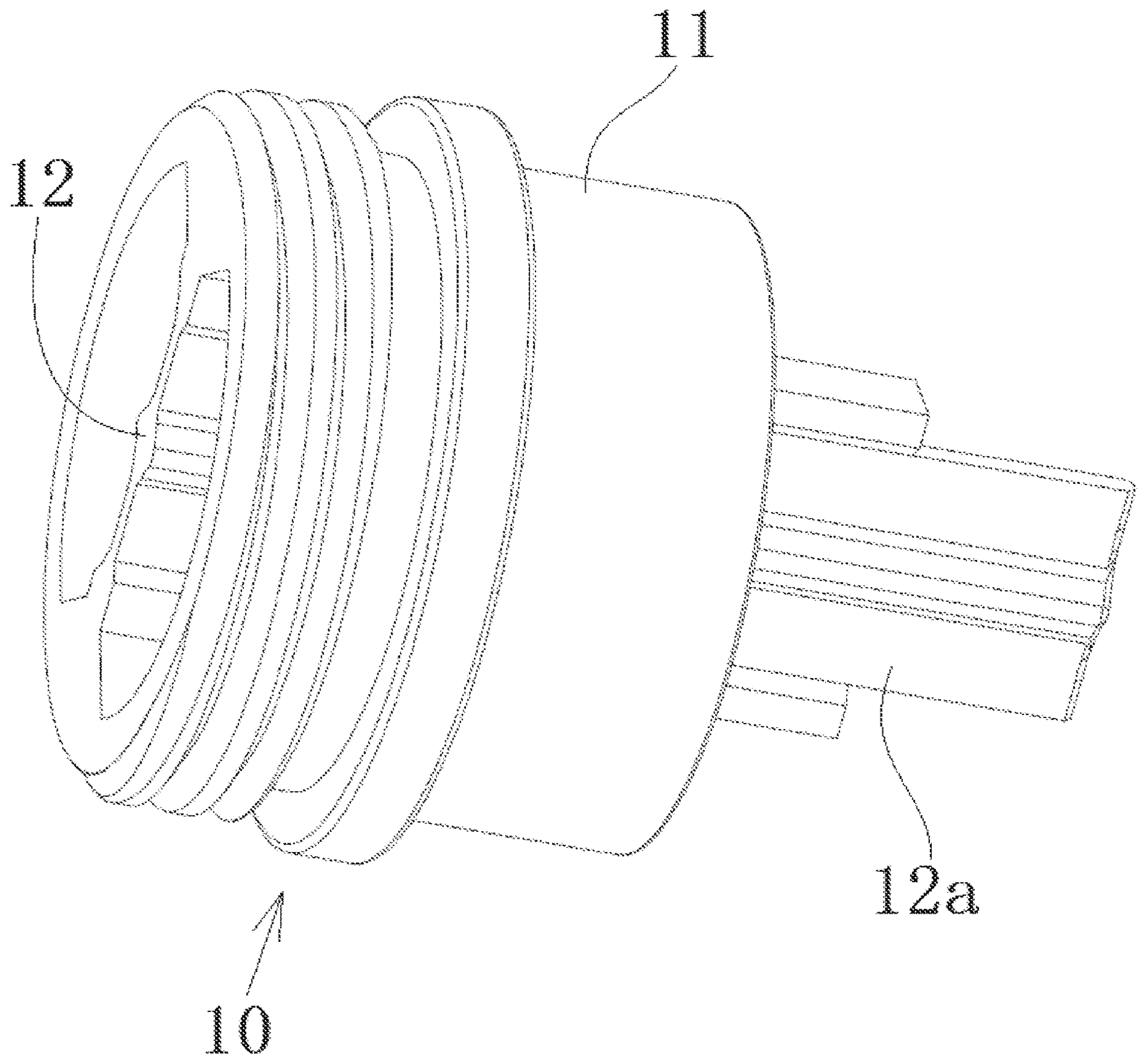
FIG. 4 is a perspective view of a shielding member of the connector.

FIG. 4 shows an illustrative perspective view of the shielding member 10 of the connector shown in FIG. 2.

As shown in FIGS. 1 to 4, in the illustrated embodiment, one end of the shield sheet 12 is located in the shield shell 11 and connected to the shield shell 11, and the other end 12*a* extends a predetermined distance from the shield shell 11 along the axial direction of the shield shell 11.

As shown in FIGS. 1 to 4, in another exemplary embodiment of the present invention, a connector assembly is also disclosed. The connector assembly comprises: a connector; and a mating connector, suitable for mating with connector. The mating connector comprises a plurality of mating terminals suitable for electrical contact with a plurality of terminals 31 and 32 of the connector. The mating connector also comprises a mating shield suitable for mating with the shield sheet 12 of the connector. The mating shield is adapted to be inserted into the slot 22 of the insulator 20 of the connector to electrical contact with the shield sheet 12 of the connector. The mating connector also comprises a mating shield shell electrically connected with the conductive nut 40 of the connector, and the mating shield sheet and the mating shield shell are formed into an integral piece.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

a shielding member having a shield shell and a shield sheet disposed in the shield shell, the shield sheet and the shield shell are formed into an integral piece;

an insulator having an end inserted into the shield shell, the insulator has a slot in which the shield sheet is inserted; and a plurality of terminals arranged in the insulator and including a power terminal and a signal terminal, the power terminal and the signal terminal are separated by the shield sheet to prevent electromagnetic interference between the signal terminal and the power terminal.

2. The connector of claim 1, wherein the shield sheet separates an internal space of the shield shell into two electromagnetic shielding spaces respectively closed in a circumferential direction.

3. The connector of claim 2, wherein the power terminal is located in one of the two electromagnetic shielding spaces and the signal terminal is located in the other of the two electromagnetic shielding spaces.

4. The connector of claim 1, wherein, when the shield sheet is inserted into the slot, the slot is sealed by the shield sheet.

5. The connector of claim 4, wherein the sealing of the slot prevents a sealant from flowing through the slot to a contact end of one of the terminals in electrical contact with a mating terminal of a mating connector.

6. The connector of claim 4, wherein the shield sheet is shaped to match the slot of the insulator.

7. The connector of claim 4, wherein the shield sheet has an irregular cross section.

8. The connector of claim 1, further comprising a conductive nut sleeved and fixed on an end of the insulator opposite the end inserted into the shield shell, the conductive nut has a threaded connection for a mating connector.

9. The connector of claim 8, further comprising a conductive spring axially compressed between the conductive nut and the shield shell and electrically connecting the shield shell and the conductive nut.

10. The connector of claim 9, wherein the conductive nut has a positioning step on an inner wall, the conductive nut is axially compressed between an end face of the shield shell and the positioning step of the conductive nut.

11. The connector of claim 10, wherein the inner wall of the conductive nut has a snapping groove.

12. The connector of claim 11, further comprising a C-type ring snapping into the snapping groove to fix the conductive nut to the insulator.

13. The connector of claim 12, wherein the insulator has an annular first positioning protrusion and the inner wall of the conductive nut has an annular second positioning protrusion, the C-type ring and the annular second positioning protrusion abut sides of the annular first positioning protrusion to fix the conductive nut to the insulator.

14. The connector of claim 8, wherein an inner wall of the conductive nut has an internal thread connectable with the mating connector or an outer wall of the conductive nut has an external thread connectable with the mating connector.

15. The connector of claim 1, further comprising an elastic sealing ring sleeved on the insulator and radially compressed between the shield shell and the insulator to seal a gap between the shield shell and the insulator.

16. The connector of claim 1, wherein a first end of the shield sheet is located in the shield shell and a second end of the shield shell extends from the shield shell for a predetermined distance along an axial direction of the shield shell.

17. The connector of claim 1, wherein the slot has a shape that has at least one notch extending away from the slot and being located between the plurality of terminals.

18. The connector of claim 17, wherein the at least one notch is V shaped.

19. A connector assembly, comprising:

a connector including a shielding member having a shield shell and a shield sheet disposed in the shield shell, an insulator having an end inserted into the shield shell, and a plurality of terminals arranged in the insulator, the shield sheet and the shield shell are formed into an integral piece, the insulator has a slot in which the shield sheet is inserted, the plurality of terminals include a power terminal and a signal terminal, the power terminal and the signal terminal are separated by the shield sheet to prevent electromagnetic interference between the signal terminal and the power terminal; and a mating connector matable with the connector, the mating connector has a plurality of mating terminals electrically connectable with the terminals of the connector.

20. The connector assembly of claim 19, wherein the mating connector includes a mating shield sheet matable with the shield sheet of the connector, the mating shield sheet is inserted into the slot in the insulator to electrically contact the shield sheet.

21. The connector assembly of claim 20, wherein the connector includes a conductive nut sleeved and fixed on an end of the insulator opposite the end inserted into the shield shell.

22. The connector assembly of claim 21, wherein the mating connector includes a mating shield shell electrically connected with the conductive nut, the mating shield shell and the mating shield sheet are formed in an integral piece.

* * * * *